(12) United States Patent
Morawietz et al.

(10) Patent No.: US 8,752,859 B2
(45) Date of Patent: Jun. 17, 2014

(54) FASTENING ARRANGEMENT FOR AN AIRBAG MODULE HOUSING

(75) Inventors: Michael Morawietz, Schwabhausen (DE); Marco Broussard, Dachau (DE)

(73) Assignee: Autoliv Development AB, Värgäda (SE)

( * ) Notice: Subject to any disclaimer, the term of this patent is extended or adjusted under 35 U.S.C. 154(b) by 97 days.

(21) Appl. No.: 13/148,718

(22) PCT Filed: Feb. 4, 2010

(86) PCT No.: PCT/EP2010/000683
§ 371 (c)(1),
(2), (4) Date: Sep. 26, 2011

(87) PCT Pub. No.: WO2010/091819
PCT Pub. Date: Aug. 19, 2010

(65) Prior Publication Data
US 2012/0007346 A1    Jan. 12, 2012

(30) Foreign Application Priority Data

Feb. 11, 2009  (DE) .......................... 10 2009 008 383

(51) Int. Cl.
*B60R 21/205* (2011.01)
*B60R 21/217* (2011.01)

(52) U.S. Cl.
USPC ...................................... 280/728.2; 280/732

(58) Field of Classification Search
USPC .................................. 280/728.2, 728.3, 732
IPC ......................................... B60R 21/205,21/217
See application file for complete search history.

(56) References Cited

U.S. PATENT DOCUMENTS

| | | | | |
|---|---|---|---|---|
| 5,135,252 A | * | 8/1992 | Suran et al. | 280/732 |
| 5,145,207 A | * | 9/1992 | Bederka et al. | 280/732 |
| 5,306,039 A | * | 4/1994 | Nakayama | 280/728.2 |
| 5,326,131 A | * | 7/1994 | Yokota et al. | 280/728.2 |
| 5,460,400 A | * | 10/1995 | Davidson | 280/728.2 |
| 5,474,323 A | * | 12/1995 | Davidson | 280/728.2 |
| 5,489,116 A | | 2/1996 | Boag | |

(Continued)

FOREIGN PATENT DOCUMENTS

| | | |
|---|---|---|
| DE | 199 49 170 A1 | 4/2000 |
| DE | 101 21 303 A1 | 5/2001 |

(Continued)

OTHER PUBLICATIONS

International Search Report—Apr. 2, 2010.

(Continued)

*Primary Examiner* — Faye M Fleming
*Assistant Examiner* — Laura Freedman
(74) *Attorney, Agent, or Firm* — Brinks Gilson & Lione

(57) ABSTRACT

A fastening arrangement has an airbag module housing for receiving an airbag and a gas generator, and a firing channel (3) to which the airbag module housing can be fixed via form-fitting elements (21). The form-fitting elements (21) enter into engagement with correspondingly designed receiving devices (311), and a flange (20) with passage openings (200) for the passage of fasteners for the final fastening of the airbag module housing (2) to the firing channel (3) or an instrument panel is arranged on the airbag module housing (2).

12 Claims, 2 Drawing Sheets

(56) References Cited

U.S. PATENT DOCUMENTS

| | | | |
|---|---|---|---|
| 5,609,355 A * | 3/1997 | Smydra et al. | 280/728.3 |
| 5,741,024 A * | 4/1998 | Enders | 280/728.3 |
| 5,799,970 A * | 9/1998 | Enders | 280/730.2 |
| 5,851,023 A * | 12/1998 | Nagata et al. | 280/728.3 |
| 6,109,645 A * | 8/2000 | Totani et al. | 280/728.3 |
| 6,161,865 A * | 12/2000 | Rose et al. | 280/728.3 |
| 6,237,936 B1 * | 5/2001 | Quade et al. | 280/730.2 |
| 6,250,669 B1 * | 6/2001 | Ohmiya | 280/732 |
| 6,296,270 B1 * | 10/2001 | Amamori | 280/728.2 |
| 6,299,196 B1 * | 10/2001 | Suzuki et al. | 280/728.2 |
| 6,481,742 B2 * | 11/2002 | Usami et al. | 280/728.2 |
| 6,502,851 B2 * | 1/2003 | Kitagawa | 280/728.2 |
| 6,601,870 B2 * | 8/2003 | Suzuki et al. | 280/728.2 |
| 7,007,970 B2 * | 3/2006 | Yasuda et al. | 280/728.3 |
| 7,080,852 B2 * | 7/2006 | Hayashi | 280/728.3 |
| 7,168,730 B2 * | 1/2007 | Seo | 280/728.2 |
| 7,216,892 B2 * | 5/2007 | Baumbach et al. | 280/728.2 |
| 7,234,724 B1 * | 6/2007 | Cowelchuk et al. | 280/728.2 |
| 7,290,790 B2 * | 11/2007 | Kielinen | 280/728.2 |
| 7,568,724 B2 * | 8/2009 | Kutchey et al. | 280/728.3 |
| 7,708,309 B2 * | 5/2010 | Kim et al. | 280/731 |
| 8,042,830 B2 * | 10/2011 | Hagelgans et al. | 280/728.2 |
| 2004/0041379 A1 * | 3/2004 | Hayashi | 280/732 |
| 2007/0132218 A1 * | 6/2007 | Kim et al. | 280/731 |

FOREIGN PATENT DOCUMENTS

| | | | |
|---|---|---|---|
| DE | 103 46 012 A1 | 7/2004 | |
| DE | 10 2004 023 680 A1 | 1/2005 | |
| DE | 20 2005 012 216 U1 | 11/2005 | |
| DE | 10 2006 025 431 A1 | 1/2007 | |
| GB | 2273471 A * | 6/1994 | B60R 21/20 |
| GB | 2391520 A * | 2/2004 | B60R 21/20 |
| WO | WO 2008/025641 A1 | 3/2008 | |

OTHER PUBLICATIONS

International Search Report—Mar. 10, 2007.

* cited by examiner

FASTENING ARRANGEMENT FOR AN AIRBAG MODULE HOUSING

CROSS REFERENCE TO RELATED APPLICATIONS

This application claims priority to German Patent Application No. 102009008383.9, filed Feb. 11, 2009 and PCT/EP2010/00683, filed Feb. 4, 2010.

TECHNICAL FIELD

The invention relates to a fastening arrangement with an airbag module housing for receiving an airbag and a gas generator to which the airbag module housing can be fixed via form-fitting elements, wherein the form-fitting elements enter into engagement with correspondingly designed receiving devices. A fastening arrangement of this type is provided in particular for driver or passenger airbags and serves to securely fix the airbag module in or to an instrument panel.

BACKGROUND OF THE INVENTION

Airbag units for motor vehicles are widely known. Airbags are installed at a multiplicity of locations in a motor vehicle in order to protect the vehicle occupants against direct impact on the vehicle structure or on parts of the interior fittings. For this purpose, compressed gas sources are activated when sensors detect an accident or an imminent accident. As a rule, the airbags are arranged behind trim panels in order, firstly, to impart an as pleasant as possible impression of the interior fittings of the vehicle to the vehicle occupant and, secondly, to protect the airbag, which is generally folded, against external influences. Suitable compressed gas sources are compressed gas accumulators and pyrotechnic propellants which may also be used together. If said "gas generators" are activated, the airbag is filled with deployment gas, expands and tears the covering or trim panel along the predetermined breaking lines provided for this purpose, and therefore the airbag can be deployed into the vehicle interior in front of the vehicle structure or an interior fittings device. To ensure a reproducible deployment operation and to influence the deployment characteristics, a "firing channel" is provided into which the deploying airbag extends from the airbag module before the airbag penetrates the covering.

DE 20 2005 012 216 U1 describes an airbag unit for a motor vehicle, in which an airbag module is connected to an annular wall of an instrument panel by latching means. The latching means are designed such that they are effective between the annular wall, the instrument panel and the opposite outer wall of the airbag module housing. The latching means act between the annular wall and the opposite outer wall of the housing and are movable transversely with respect to the annular wall such that the housing and the annular wall can be connected to each other in a simple manner by means of a relative movement along the longitudinal axis of the annular wall.

SUMMARY OF THE INVENTION

It is the object of the present invention to provide a fastening arrangement with which, firstly, easy preassembly of the airbag module housing and, secondly, a stable and reliable final fastening of the airbag module housing to a firing channel or an instrument panel can take place.

The fastening arrangement according to the invention with an airbag module housing for receiving an airbag and a gas generator to which the airbag module housing can be fixed via form-fitting elements, wherein the form-fitting elements enter into engagement with correspondingly designed receiving devices provides that a flange with passage openings for the passage of fastening means for the final fastening of the airbag module housing to a firing channel or to the instrument panel is arranged on the airbag module housing. By means of the formation of a flange, it is possible to securely fix the position of the airbag module housing relative to the firing channel or the instrument panel such that there is a defined distance between the airbag module housing, and therefore the airbag located therein, and the covering in relation to the vehicle occupant. As a result, it is possible to provide improved deployment reproducibility. Furthermore, it is avoided that the airbag module housing moves relative to the firing channel or the instrument panel, since the airbag module housing can be fixed nondisplaceably to the firing channel or to the instrument panel via the fastening means, for example screws or the like. The form-fitting elements serve merely for the preassembly of the airbag module housing on the firing channel or the instrument panel while the fastening means bring about the secure fixing of the airbag housing. As a result, it is possible to simplify the installation of the airbag module, since the airbag module housing can be placed onto the firing channel or the instrument panel and provisionally fixed such that both of the worker's hands are available for the final installation. The installation accuracy and installation quality are thereby increased.

A development of the invention provides that the firing channel is formed integrally in an instrument panel of a motor vehicle or in a motor vehicle structure, for example by the firing channel being injection molded onto or integrally formed on the instrument panel of the motor vehicle structure during the manufacturing process of the same.

In one alternative, it is provided that the firing channel is designed as a separate connection piece which has fastening devices for the airbag module housing and on a vehicle structure. In this case, the firing channel is fitted on the vehicle structure and placed in front of the airbag module housing, and the airbag module housing is finally fastened to the firing channel or the vehicle structure.

The form-fitting elements can be arranged or formed on the flange. If the airbag module housing is formed from a plastics material, the form-fitting elements are preferably injection molded or cast thereon, and if the airbag module housing is formed, for example, from a metal, the form-fitting elements can be punched out therefrom and formed by deformation. It is also possible for form-fitting elements to be manufactured separately and fastened to the airbag module housing.

The form-fitting elements can be arranged either on the outer flange edge or within the flange. If a form-fitting element is arranged outside the outer flange edge, it protrudes beyond the latter, with it being possible for it to originate from the outer circumference of the flange or to branch off from a flange supporting surface which is oriented substantially perpendicularly to the airbag module housing wall. The arrangement within the flange indicates that the form-fitting elements are located within the outer circumference of the flange and do not protrude there beyond.

In one variant of the invention, it is provided that the form-fitting elements extend through a passage opening in the flange, with the form-fitting elements extending beyond at least one bearing surface of the flange such that preassembly can take place in a simple manner by placing or pushing the flange onto the instrument panel or the firing channel. The arrangement within a passage opening has the advantage that the form-fitting element is well protected against external influences and cannot be damaged by means of lateral loadings and impact during transportation.

As an alternative to an arrangement of the form-fitting elements on the flange, it is provided that the form-fitting elements are also formed or arranged directly on the airbag module housing in order to permit provisional fixing on the instrument panel or the firing channel.

The form-fitting elements are preferably designed as resilient latching tabs which have an insertion slope, by means of which a displacement takes place perpendicularly to the insertion direction of the airbag module housing in the direction of the firing channel or the instrument panel. As soon as the intended installation position is reached, the latching tabs spring back and lock the airbag module housing to the instrument panel or the firing channel in a form-fitting manner.

A development provides that in general at least one aligning device is arranged or formed on the flange or else on the airbag module housing, by means of which aligning device it is ensured that the airbag module housing is precisely positioned on the instrument panel or the firing channel. The aligning device can be designed as a pin, projection or bolt which is inserted into a corresponding receptacle in the instrument panel or the firing channel in order to ensure that the airbag module housing is correctly oriented and positioned during the preassembly. Conversely, the aligning device may also be arranged or formed on the instrument panel or the firing channel and the receptacle on the airbag module housing.

The form-fitting elements may be aligned oriented counter to the opening direction of the airbag such that they can absorb additional forces which are produced during the triggering of the airbag and are exerted on the airbag module housing. In principle, however, it is also possible that the form-fitting elements are effectively aligned in the opening direction of the airbag if this corresponds to the installation requirements of the airbag module housing.

Predetermined breaking points can be arranged on the form-fitting elements such that, after the final installation of the airbag module housing on the instrument panel or the firing channel, the elements which are then no longer necessary can be removed. In principle, there is the possibility for the form-fitting elements also to be arranged in the passage openings through which the fastening means are passed such that it is possible for the form-fitting element to break off and be removed upon insertion of the fastening means into the respective passage opening.

BRIEF DESCRIPTION OF THE DRAWINGS

The exemplary embodiments of the invention are explained in more detail below with reference to the attached figures. In the figures.

DETAILED DESCRIPTION OF THE DRAWINGS

Figure 1:
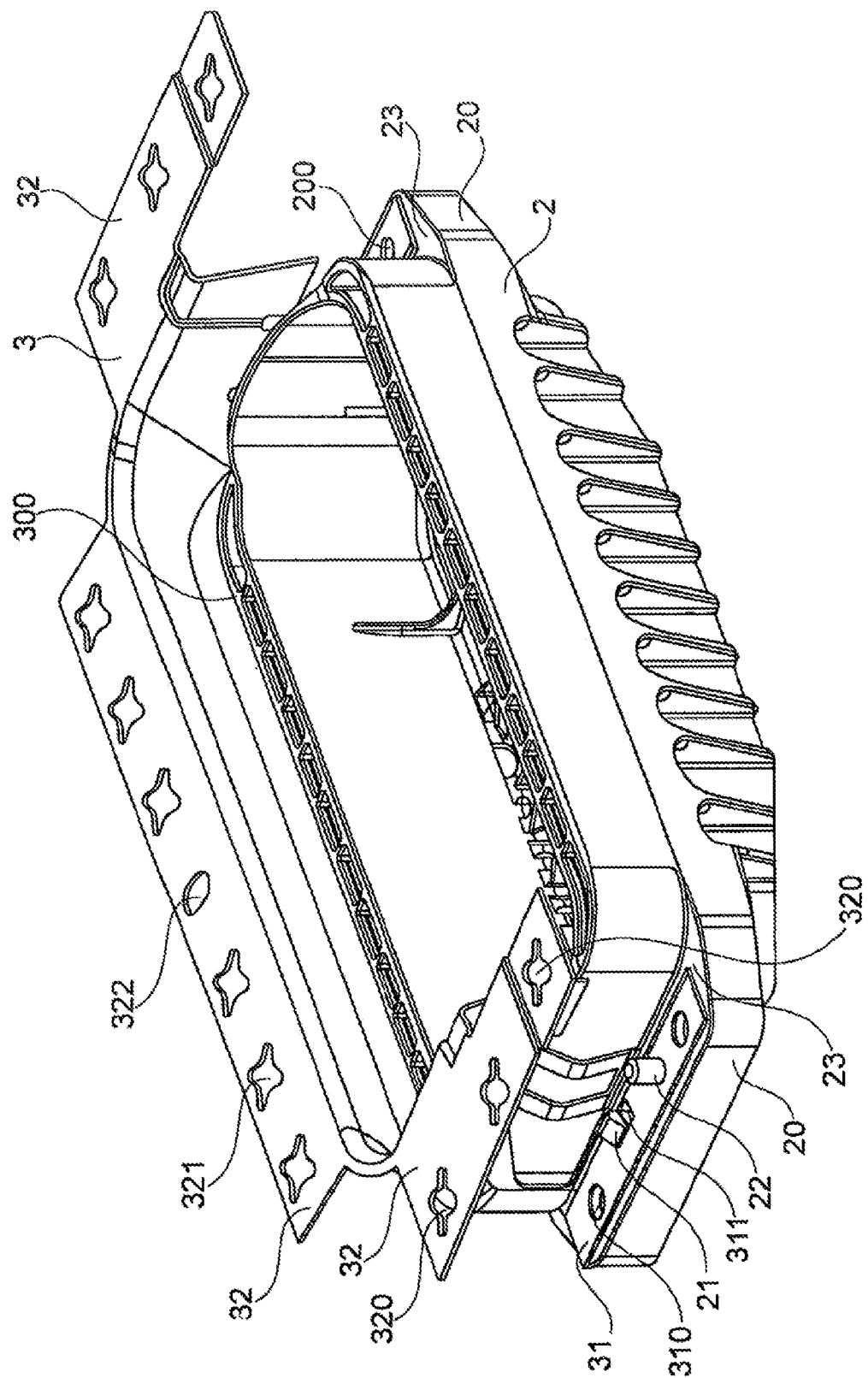
FIG. 1 shows a perspective partial sectional illustration of an airbag housing fastened to a firing channel.

FIG. 1 illustrates, in a perspective partial sectional illustration, a fastening arrangement with an airbag module housing 2 in which an airbag and a gas generator can be placed in order to be attached together with the airbag module housing 2 to a vehicle structure or to a holding device within a vehicle. The airbag module housing 2 is designed as a shell and has an upper opening from which the collapsed airbag (not illustrated) can emerge after a gas generator is fired. Two flanges 20 which protrude laterally from the wall of the airbag module housing 2 are formed on the airbag module housing 2. In the exemplary embodiment illustrated, the two flanges 20 are arranged on the narrow sides of the airbag module housing 2 which is of substantially rectangular design. In principle, the flange 20 may also be designed such that it is completely encircling or may be arranged or formed on the longitudinal sides of the airbag module housing 20. In the exemplary embodiment illustrated, the airbag module housing 20 is produced from a plastics material, and alternative housing materials, such as, for example, light metal can likewise be used.

Bearing surfaces 23 are formed on the flanges 20 substantially perpendicularly to the opening or deployment direction of the airbag. Form-fitting elements 21, which are effective substantially perpendicularly to the deployment direction and are in the form of resilient latching tabs extending from the bearing surfaces 23 are formed on the flanges 20 substantially perpendicularly to the opening or deployment direction of the airbag. Aligning devices 22 in the form of aligning pins likewise extend from the bearing surfaces 23 in order to be able to fix the airbag module housing 2 in the correct position and orientation. Furthermore, passage openings 200 are formed in the flanges 20, through which passage openings fastening means (not illustrated) can be passed in order to fix the airbag module housing 2 in the vehicle structure, for example to an instrument panel, a support or a separate firing channel.

FIG. 1 shows such a separate firing channel 3 which can be manufactured from plastic or metal and forms a sleeve 300 which is oriented substantially parallel to the opening direction of the airbag and as an extension of the opening of the airbag module housing 2. The sleeve 300 extends the airbag module housing 2 and creates a free space in which the airbag can be deployed. Bent-over tabs 31, 32 which have a substantially planar orientation are formed on the upper and lower sides of the sleeve 300. The tab 31 which faces the supporting surface 23 of the flange 20 has passage openings 310 which are positioned in the flange 20 in a manner corresponding to the passage openings 200 and rest in an aligned manner thereon. A receiving device 311 for the form-fitting device 21 is likewise provided, and therefore the airbag module housing 20 can be fixed in a form-fitting manner to the tab 31 which faces the flange 20.

The separate firing channel 3 likewise has, on the upper tabs 32, passage openings 320, 321, and 322 via which the firing channel can be fixed to an instrument panel or to another vehicle structure either before or after the installation of the airbag module housing 2. The fixing takes place, for example, via screws which are passed through the passage openings 321. The firing channel 3 can be positioned on the instrument panel via positioning aids which are inserted into the passage opening 322. The airbag module housing 2 is finally fixed to the firing channel through the passage opening 310 in conjunction with the passage opening 200 in the flange 20, and it is likewise possible for fastening to the instrument panel to be also able to take place through passage openings 320 in the remote tabs 32 by means of the fastening means (not illustrated). The airbag module housing 2 is aligned relative to the lower tabs 31 via the aligning devices 22 in the form of the integrally formed fixing pins.

Figure 2:
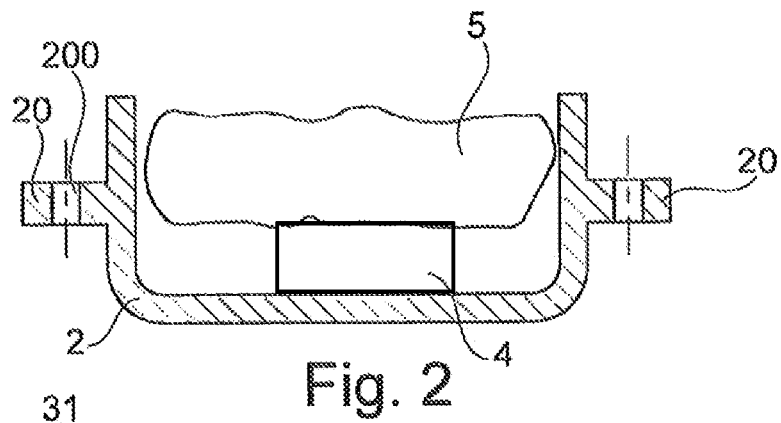
FIG. 2 shows a sectional illustration through an airbag housing.

FIG. 2 illustrates, schematically in a sectional illustration, the construction of an airbag module housing 2 with lateral protruding flanges 20 which have passage openings 200. A gas generator 4 and a collapsed airbag 5, which is deployed upward through the opening when the gas generator 4 is activated, are arranged within the airbag module housing 2.

Figures 3, 4:
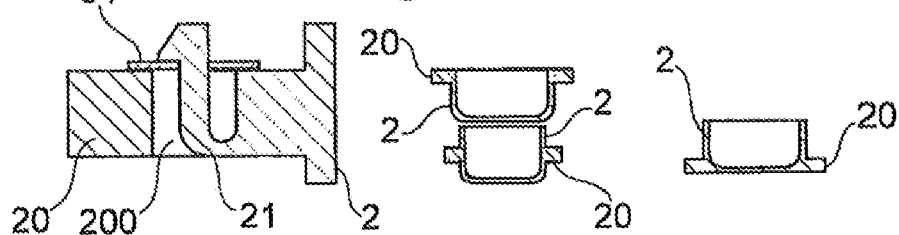
FIG. 3 shows a detailed view of an airbag housing in a sectional illustration.
FIG. 4 shows different arrangements of a flange on an airbag housing.

FIG. 3 illustrates, in a detailed illustration, the flange 20 of the airbag module housing 2, in which a form-fitting element 21 in the form of a resilient latching tab is formed within the passage opening 200. The tab 31 of the separate firing channel 3 is likewise illustrated. The snap-in hooks which are integrated in the airbag module housing 2 or resilient latching tabs 21 are therefore clipped in the firing channel 3 without additional components being required. As a result, it is possible to pre-fix the airbag module housing 2 to the gas generator 4 and the airbag 5 in a self-supporting manner in the desired end position before the actual installation begins. The final installation then takes place by means of additional, separate fastening means which are passed through passage openings 200 within the flange 20 and are fastened to the tab 31. Furthermore, the fastening means can also be fixed to other elements of the vehicle structure.

The flange 20 can be formed at different locations on the airbag module housing 2. FIG. 4 illustrates different positionings of the flange 20, namely on the upper edge of the airbag module housing, in the center of the housing wall and on the lower edge of the airbag module housing 2, i.e. in the region of the closed chamber or the base of the airbag module housing 2.

Instead of a fastening to a separate firing channel 3, as illustrated in FIG. 1 or in FIG. 3, provisional fixing can also take place directly on a supporting frame, an instrument panel, a trim panel of an instrument panel, on a vehicle body or another vehicle structural part via the form-fitting elements 21. It is necessary for this purpose that corresponding receiving devices for the form-fitting elements 21 are formed or arranged on the respective support.

Figure 5:
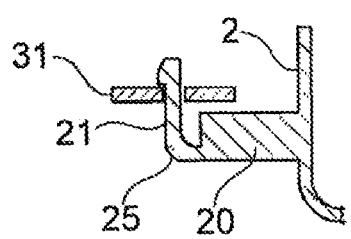
FIG. 5 shows a detailed sectional illustration with a form-fitting element on the outer flange edge.

FIG. 5 shows a variant of the invention in which the form-fitting element 21 in the form of a resilient latching tab is not formed in the passage opening 200 within the flange 20 but rather on the outer circumference of the flange 20, i.e. on the outer flange edge. The relatively thin configuration of the form-fitting element 21 permits a lightweight construction and also rapid removal of the form-fitting element 21 if it is no longer required. For this purpose, for example, a predetermined breaking point 25, along which the material integrity preferably fails by application of a force, is formed on the form-fitting element.

Figure 6:
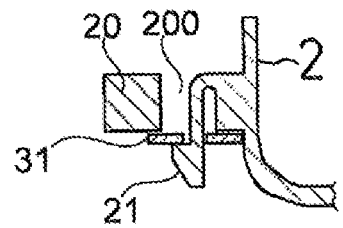
FIG. 6 shows a variant of FIG. 3 with the form-fitting element aligned the other way around.

FIG. 6 shows a variant of the invention, in which a form-fitting element 21, as shown in FIG. 3, is formed in a different orientation in the flange 20. Whereas, in FIG. 3, the locking takes place in the opening direction and the insertion slope of the form-fitting element 21 widens downwards, it is provided in FIG. 6 that the form-fitting element 21 is oriented counter to the opening direction. In the opening direction means that the insertion direction of the form-fitting element 21 runs in the direction in which the airbag 5 is also deployed. This is the case, for example, if the airbag module housing 2 is inserted into a firing channel 3 behind a trim panel. In the variant according to FIG. 6, the airbag module housing 3 is fitted with the closed side in front, for example when the airbag module housing 2 is pushed into a receptacle which, after the airbag module housing 2 is pushed in or inserted, is closed again by a covering. Said covering then covers the opening within the airbag module housing 2. In the version according to FIG. 6, the forces which are effective during the deployment of the airbag 5 are conducted away via the flange 20 and the tab 31 or the support whereas, in the case of the orientation according to FIG. 3, force is transmitted either solely via the fastening means (not illustrated), such as screws or the like, or force is partially transmitted via the form-fitting element 21.

Figure 7:
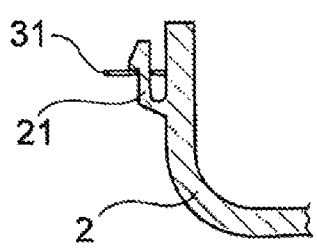
FIG. 7 shows a form-fitting element directly on the airbag housing wall.
Figure 8:
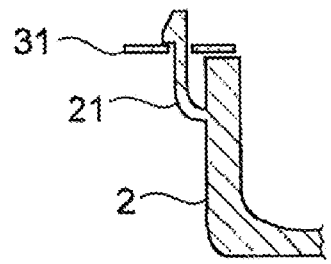
FIG. 8 shows a variant of FIG. 7.

FIGS. 7 and 8 illustrate different configurations of the form-fitting element 21 directly on the housing wall of the airbag module housing 2. While FIG. 7 shows the variant in which the form-fitting element 21 runs below the upper edge of the airbag module housing 2, FIG. 8 shows the variant in which the form-fitting element 21 projects over the upper edge of the airbag module housing 2. Predetermined breaking points can be provided even when the form-fitting elements 21 are arranged or formed directly on the housing wall. The airbag module housing 2 is finally fastened via other fastening means, not via the form-fitting element 21 or the form-fitting elements 21. The form-fitting elements 21 can only be loaded to the extent necessary for supporting the deadweight of the airbag module housing 2, and therefore the form-fitting elements 21 can be of very small and delicate design.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fastening arrangement comprising:
an airbag module housing for receiving an airbag;
a radial flange formed entirely on the airbag module housing, the flange bearing form-fitting elements for fixing the airbag module housing to a tubular firing channel, the form-fitting elements being configured to enter into correspondingly designed receiving devices in a direction parallel to the airbag opening direction and to snap into a formfitting engagement; and the flange further having passage openings for fastening means fastening the airbag module housing to the firing channel or an instrument panel.

2. The fastening arrangement according to claim 1, further comprising that the firing channel is formed integrally in an instrument panel of a motor vehicle or in a motor vehicle structure.

3. The fastening arrangement according to claim 1, further comprising that the firing channel is designed as a separate connection piece which has fastening means for fastening the airbag module housing to the firing channel and to a vehicle structure.

4. The fastening arrangement according to claim 1, further comprising that the form-fitting elements are formed on the flange.

5. The fastening arrangement according to claim 1 further comprising that the form-fitting elements extend through the passage openings in the flange.

6. The fastening arrangement according to claim 1, further comprising that the form-fitting elements are arranged on an airbag module housing wall.

7. The fastening arrangement according to claim 1, further comprising that the form-fitting elements are designed as resilient latching tabs.

8. The fastening arrangement according to claim 1, further comprising at least one aligning device arranged on the flange.

9. The fastening arrangement according to claim 1, further comprising that predetermined breaking points are arranged on the form-fitting elements.

10. A fastening arrangement comprising:
an airbag module housing for receiving an airbag;
form-fitting elements for fixing the airbag module housing to a tubular firing channel, the form-fitting elements being configured to enter into correspondingly designed receiving devices in a direction parallel to the airbag opening direction and to snap into a formfitting engagement; and
a radial flange formed entirely on the airbag module housing, the flange having passage openings for fastening means fastening the airbag module housing to the firing channel or to an instrument panel; and
at least one aligning device formed by a pin or bolt arranged on the flange.

11. A fastening arrangement comprising:
an airbag module housing for receiving an airbag;
form-fitting elements for fixing the airbag module housing to a tubular firing channel, the form-fitting elements being configured to enter into engagement with correspondingly designed receiving devices; and
a radial flange formed on the airbag module housing, the flange having passage openings for fastening means fastening the airbag module housing to the firing channel or to an instrument panel;
wherein the form-fitting elements are oriented for insertion into the receiving devices, the insertion being in a direction opposite to an airbag opening direction.

12. The fastening arrangement according to claim 11, further comprising that the form-fitting elements extend from the flange.

* * * * *